Figure 1:
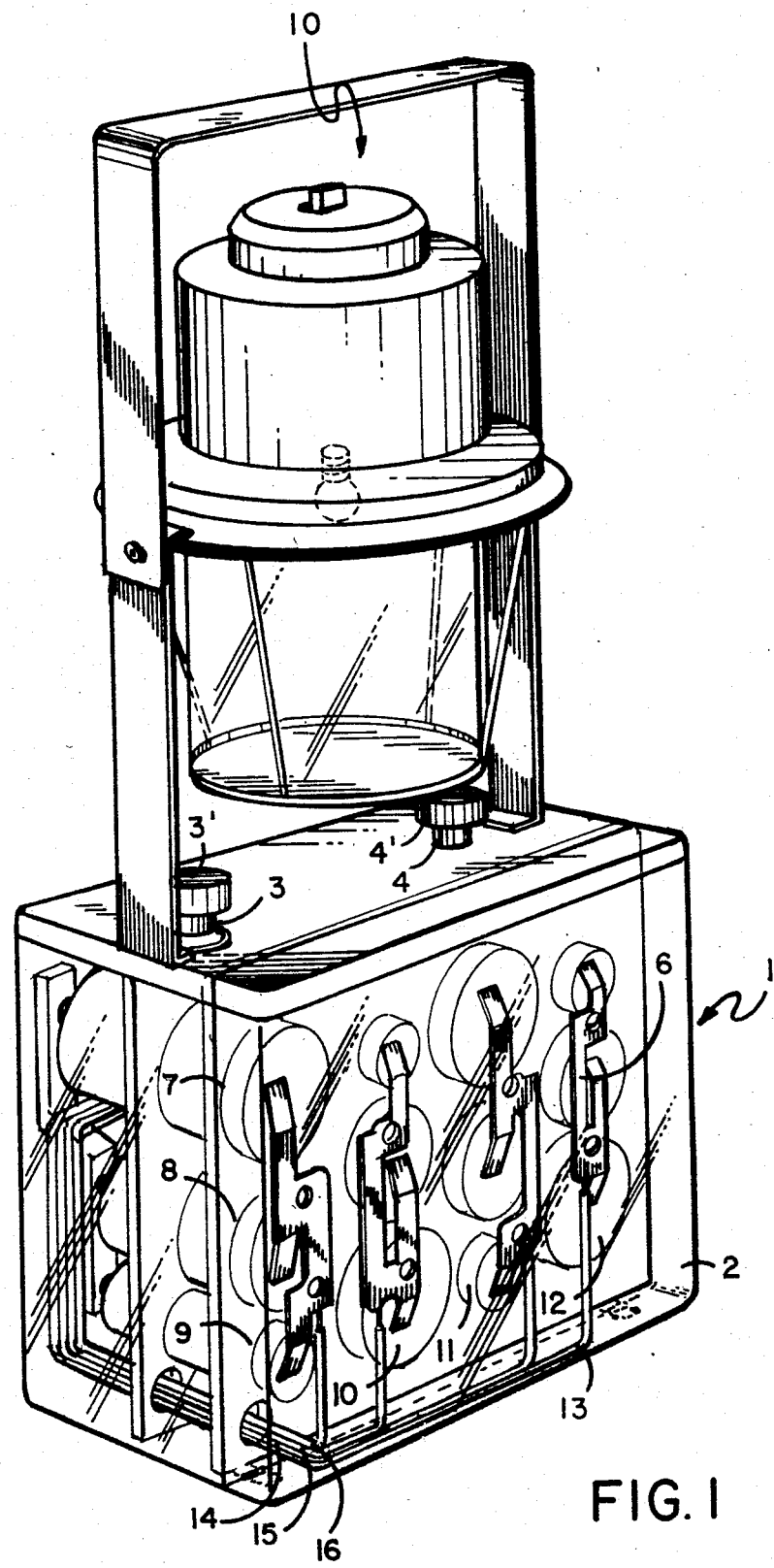

United States Patent [19]

Bruneau

[11] Patent Number: 4,607,207

[45] Date of Patent: Aug. 19, 1986

[54] BATTERY POWERING

[76] Inventor: Louis O. Bruneau, 44 Drabbington Way, Weston, Mass. 02193

[21] Appl. No.: 656,269

[22] Filed: Oct. 1, 1984

[51] Int. Cl.⁴ ..................... H01M 2/10; H01M 10/48
[52] U.S. Cl. .......................................... 320/2; 320/15; 362/194; 429/99; 429/100
[58] Field of Search ......................................... 320/2–5, 320/15; 429/96, 99, 100, 9; 362/183, 154, 190, 192, 194, 200, 201

[56] References Cited

U.S. PATENT DOCUMENTS

| 2,818,463 | 12/1957 | Parker | 429/99 |
| 2,918,668 | 12/1959 | Stube | 362/194 X |
| 3,015,719 | 1/1962 | Kirkman | 362/194 X |
| 4,303,876 | 12/1981 | Kelly, III et al. | 320/5 X |
| 4,431,717 | 2/1984 | Kikuchi | 429/100 |

FOREIGN PATENT DOCUMENTS 434603 11/1974 U.S.S.R. .................................. 320/2

*Primary Examiner*—R. J. Hickey
*Attorney, Agent, or Firm*—Charles Hieken

[57] ABSTRACT

A battery case hinged at the bottom is of substantially the same size as a conventional heavy-duty six-volt battery and has positive and negative terminals located at substantially the same spacing of positive and negative terminals of a conventional heavy-duty six-volt battery. The case accommodates four columns of batteries with each column accommodating a D, C and AA battery between pairs of conducting strips connected in series. In each column the C battery is located intermediate the D and AA battery. In adjacent columns, the D battery is adjacent to the AA battery. The negative and positive terminals are connected to the extreme ones of the conducting strips to develop six volts therebetween, each triad of batteries being connected in parallel between a respective pair of conducting strips. Resilient contacts attached to negative ones of the conducting strips engage the negative terminal of a respective battery and urge it toward a positive conducting strip. Each positive conducting strip has a pair of fixed contacts for engagement with the positive terminal of a C and AA battery, respectively.

4 Claims, 2 Drawing Figures

BATTERY POWERING

The present invention relates in general to battery powering and more particularly concerns novel apparatus and techniques for facilitating using a wide variety of battery sizes to power portable electrical equipment, such as a flashlight or lantern system. The invention is especially advantageous in providing a means for conveniently substituting dry cells of a variety of sizes for a single heavy-duty six-volt battery typically used in a lantern.

A search of the prior art uncovered U.S. Pat. Nos. 3,579,075, 3,696,283, 3,758,773, 3,794,825, 4,232,260, 4,285,030, and 4,285,032.

It is an important object of this invention to provide improved methods and means for battery powering portable electrically powered devices, such as a flashlight or a lantern.

According to the invention, there are a plurality of generally parallel contact strips defining a plurality of cascaded battery cell chambers. A contiguous pair of contact strips includes a plurality of resilient contacts each opposite a fixed contact for accommodating a battery cell therebetween, the space between at least one of these pairs of fixed and resilient contacts being different from that between the others for accommodating battery cells of different size.

Figure 2:
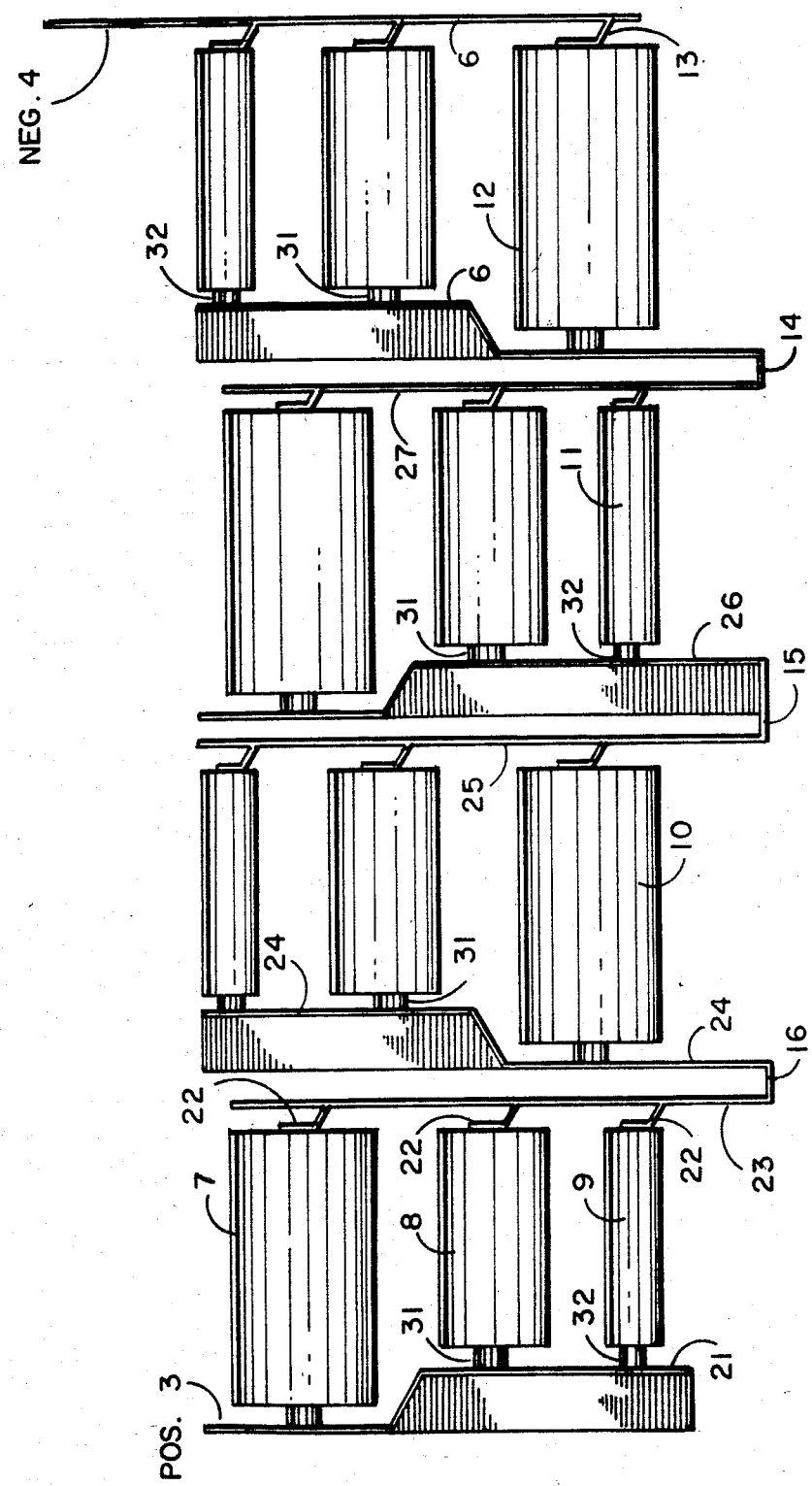

Numerous other features, objects and advantages of the invention will become apparent from the following specification when read in connection with the accompanying drawing in which:

FIG. 1 shows a perspective view of an embodiment of the invention functioning as a substitute for a single heavy-duty battery in a flashlight lantern; and FIG. 2 is a pictorial representation of the arrangement of batteries of different sizes shown in FIG. 1.

With reference now to the drawing and more particularly FIG. 1 thereof, there is shown a perspective view of an embodiment of the invention providing battery power to a flashlight lantern in place of a single heavy-duty six-volt battery. A flashlight 10 is secured to battery case 1 with positive terminal nut 3' and negative terminal nut 4' mounted on threaded terminals 3 and 4 extending from battery case 1 in the same positions that correspondingly threaded terminals would be located at the top of a standard heavy-duty six-volt battery. Case 1, having a side cover 2 hinged at the bottom, is preferably about the same size as a heavy-duty six-volt battery.

Case 1 is formed with openings for accommodating different size conventional batteries. Openings 7, 8 and 9 are of diameter slightly greater than that of D, C and AA batteries, respectively. These openings may be formed in vertical inside panels. The particular arrangement of four triads of holes as shown, alternating largest diameter at top with smallest diameter at the bottom and intermediate diameter in between, but staggered, maximizes the number of batteries that may be accommodated in a given size compartment. A vertical conducting strip, such as 6, is positioned to engage the negative terminal of each triad of batteries in a column. Similar vertical conducting strips (not visible in FIG. 1) engage the positive terminals of each cell. Four flexible wires 13, 14, 15 and 16 connect the pairs of strips in series. The columns of batteries, such as those in openings 9, 10, 11 and 12 are thus connected in series. The batteries in each column are connected in parallel.

Referring to FIG. 2, there is shown a pictorial representation of the interconnections spread out to better illustrate the principles of the interconnection and physical arrangement of the batteries in a column and the series connection of the four columns. Thus, batteries 7, 8 and 9 in the left column as shown with their positive terminals connected to positive strip 21 and their negative terminals connected by a resilient contact, such as 22 to a negative strip 23 that is in turn connected by wire 16 to positive strip 24 of the second column including battery 10. Similarly, negative strip 25 is connected by wire 15 to positive strip 26 of the column including AA battery 11, and negative strip 27 is connected by wire 14 to positive strip 6' of the column including D battery 12. The four columns are thus connected in series between positive terminal 3 and negative terminal 4.

The spacing between the respective positive strips and the negative strips corresponds substantially to a distance slightly greater than the length of a D cell, such as 7, 10 or 12. Depending terminals, such as 31 extend from each positive strip for engagement with the positive terminal of a respective C battery such as 8. Similarly, terminals, such as 32, extend from each positive strip for engagement with the positive terminal of a respective AA battery, such as 9 and 11.

The invention has a number of advantages. It may act as a substitute for a single heavy-duty six-volt battery while using any conventional dry or rechargeable cell, such as AA, C and D. The invention thus allows for the use in a flashlight or lantern system or other portable electrical device, a variety of conventional battery sizes so that the user may still obtain batteries to power the device, even though one or more sizes may be unavailable at a retail outlet. Furthermore, the invention enables virtually complete energy consumption of a battery without the device being powered failing because it allows the use of residual energy in batteries that no longer function adequately to themselves power an electrical device, to coact with other batteries in a column and adequately power the device to which the invention is connected. In addition, the 6-volt lantern will still function with any combination of a single battery in each column.

While the invention has been described with a specific number of columns for accommodating a specific number of battery sizes, it is evident that the invention may be adapted for accommodating other battery sizes and be arranged in any number of columns. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:
1. Battery powering apparatus comprising,
first and second terminals,
a plurality of generally parallel contact strips defining a plurality of cascaded battery cell chambers,
a contiguous pair of said contact strips including a plurality of resilient contacts each opposite a fixed contact for accommodating a battery cell therebetween, the space between at least one of these pairs of fixed and resilient contacts being different from that between the others for accommodating battery cells of different size, and means for connecting said pairs of contact strips in series between said first and second terminals.

2. Battery powering apparatus in accordance with claim 1 wherein a first battery size is D and the spacing between each contiguous pair of said contact strips corresponds substantially to the length of a D size battery cell, there are at least two of said resilient contacts, one for engagement with a C size battery cell and the other for engagement with an AA size battery cell with the contact for engagement with the C size battery cell always intermediate the location of the spaces for accommodating D and AA battery cells with adjacent ones of said contiguous pairs of contact strips having the D battery cell location adjacent to the AA battery cell location for enhancing the number of different size battery cells that may be accommodated in a given rectangular volume.

3. Battery powering apparatus in accordance with claim 2 wherein there are four of said contiguous pairs of contact strips located substantially in the space occupied by a conventional six-volt heavy-duty battery with said first and second terminals located substantially in the location of the positive and negative terminals of a conventional heavy-duty six-volt battery for connection to a portable electrical device conventionally powered by a conventional heavy-duty six-volt battery.

4. Battery powering apparatus in accordance with claim 2 wherein there are four pairs of said conducting strips located substantially in the space occupied by a conventional six-volt heavy-duty battery with said first and second terminals located substantially in the location of the positive and negative terminals of a conventional heavy-duty six-volt battery for connection to a portable electrical device conventionally powered by a conventional heavy-duty six-volt battery.

* * * * *